United States Patent [19]

Hattori et al.

[11] Patent Number: 4,491,364
[45] Date of Patent: Jan. 1, 1985

[54] LUMBER SUPPORT SYSTEM FOR A VEHICLE SEAT

[75] Inventors: Takemi Hattori; Kozo Esaki, both of Aichi, Japan

[73] Assignees: Aisin Seiki Kabushiki Kaisha, Kariya; Toyota Jidosha Kogyo Kabushiki Kaisha, Toyota, both of Japan

[21] Appl. No.: 348,275

[22] Filed: Feb. 12, 1982

[30] Foreign Application Priority Data

Feb. 19, 1981 [JP] Japan .................. 56-23372

[51] Int. Cl.³ .............................. A47C 7/42
[52] U.S. Cl. .................... 297/284; 137/871; 137/881; 297/DIG. 3
[58] Field of Search .............. 297/284, DIG. 3; 91/454, 457, 446; 137/871, 881

[56] References Cited

U.S. PATENT DOCUMENTS

| | | | |
|---|---|---|---|
| 2,136,510 | 9/1936 | Jensen | 297/284 |
| 2,478,002 | 8/1949 | Mott | 91/457 |
| 2,506,008 | 5/1950 | Arps | 91/454 |
| 2,535,785 | 12/1950 | Couri | 91/457 |
| 2,854,953 | 10/1958 | Osborne | 91/457 |
| 3,326,601 | 6/1967 | Vanderbilt et al. | 297/284 |
| 3,335,756 | 8/1967 | McPherson | 137/871 |
| 3,363,941 | 1/1968 | Wierwille | 297/284 |
| 3,774,504 | 11/1973 | Bonney | 91/457 |
| 3,784,994 | 1/1974 | Kery | 297/284 |
| 3,867,732 | 2/1975 | Morrell | 297/284 |
| 4,190,286 | 2/1980 | Bentley | 297/284 |

FOREIGN PATENT DOCUMENTS 1675436 12/1970 Fed. Rep. of Germany ...... 137/871

Primary Examiner—Francis K. Zugel
Assistant Examiner—M. Wendell Binder
Attorney, Agent, or Firm—Oblon, Fisher, Spivak, McClelland & Maier

[57] ABSTRACT

A lumber support system comprising an air bag disposed behind the upholstery sheet of a vehicle seat, a manual air pump and a valve assembly for controlling the supply of air from the manual air pump into the air bag as well as the discharge of the air contained in the air bag. The valve assembly comprises a valve casing being attached to the vehicle seat and provided with a partition wall partitioning the interior of the valve casing into first and second chambers, an inlet port for allowing the communication of the first chamber with the outlet of the manual air pump, a discharge port for allowing the communication of the first chamber with the exterior of the valve casing, an outlet port allowing the communication of the second chamber with the air bag, a manually operable push button movably supported on the valve casing, a first normally closed valve formed within the first chamber for normally closing to interrupt the communication between the first chamber and the discharge port and adapted to be opened when the push button is depressed manually, and a second normally closed valve formed within the second chamber for normally closing an opening formed on the partition wall to interrupt communication between the first and second chambers therethrough and adapted to be opened when pressurized air is supplied into the first chamber and when the first normally closed valve is opened.

6 Claims, 2 Drawing Figures

LUMBER SUPPORT SYSTEM FOR A VEHICLE SEAT

BACKGROUND OF THE INVENTION

1. Field of the Invention

This invention relates to a lumbar support system for securely supporting a person seated in the seat at his waist by making the upholstery sheet of the seat partially protrude at portions corresponding to air bags disposed behind the upholstery sheet of a vehicle seat by supplying air into an air bag, and more particularly, to a lumbar support system in which the degree of the protrusion of the upholstery sheet can optionally be adjusted.

2. Description of the Prior Art

Some vehicle seats, particularly some motor vehicle seats, are provided with a lumbar support at a position corresponding to the waist of the seated person. Usually, such a lumbar support is formed by providing a supporting pad behind the upholstery sheet of a vehicle seat so as to be movable with respect to the frame of the seat. The supporting pad is moved to a desirable position to adjust the relative position of the protrusion of the upholstery sheet corresponding to the position of the supporting pad with respect to the seated person.

When a mechanical means capable of selectively moving the supporting pad to a plurality of predetermined positions is employed as means to move the supporting pad, the supporting pad cannot be adjusted to an intermediate position between two predetermined positions. When a motor-driven means is employed as means to move the supporting pad, the supporting pad can be adjusted to an optional position, however, the motor-driven means requires complicated and costly mechanism.

SUMMARY OF THE INVENTION

Generally speaking, the present invention provides a lumbar support system for a vehicle seat including an air bag as a lumbar support, more particularly, a lumber support system facilitated by the optional adjustment of the relative position of the lumbar support with respect to the person seated himself in the vehicle seat.

According to the present invention, there is provided a lumbar support system for a vehicle seat, comprising in combination; a pressurized air source; an air bag supported between the upholstery sheet and the cushion material of the vehicle seat; a valve casing attached to the vehicle seat and having a wall partitioning the interior space of the valve casing into a first chamber and a second chamber; an inlet port through which the first chamber communicates with the pressurized air source; a discharge port through which the first chamber communicates with the exterior of the valve casing; an outlet port through which the second chamber communicates with the air bag and an opening provided in the wall for allowing the communication of the first chamber with the second chamber; a push button supported movably on the valve casing; a first normally closed valve normally closing the discharge port of the first chamber and adapted to be opened by the manual operation of the push button; and a second normally closed valve normally closing the opening of the wall and adapted to be opened when the first normally closed valve is opened as well as when the pressurized air is supplied in the first chamber from the pressurized air source.

Accordingly, an object of the present invention is to provide a lumbar support system capable of supporting a person seated in a vehicle seat at his waist by means of an air bag inflated by pressurized air.

Another object of the present invention is to provide a lumbar supporting system in which the quantity of the pressurized air in the air bag can be controlled through the manual operation of a push button.

A further object of the present invention is to provide a lumbar support system in which pressurized air is supplied to a plurality of air bags provided for a vehicle seat from a common pressurized air source and the respective quantities of the pressurized air in the air bags can be controlled individually.

BRIEF DESCRIPTION OF THE DRAWINGS

Various other objects, features and attendant advantages of the present invention will be more fully appreciated as the same becomes better understood from the following detailed description when considered in connection with the accompanying drawings, in which.

DETAILED DESCRIPTION OF THE PREFERRED EMBODIMENT

Figure 1:
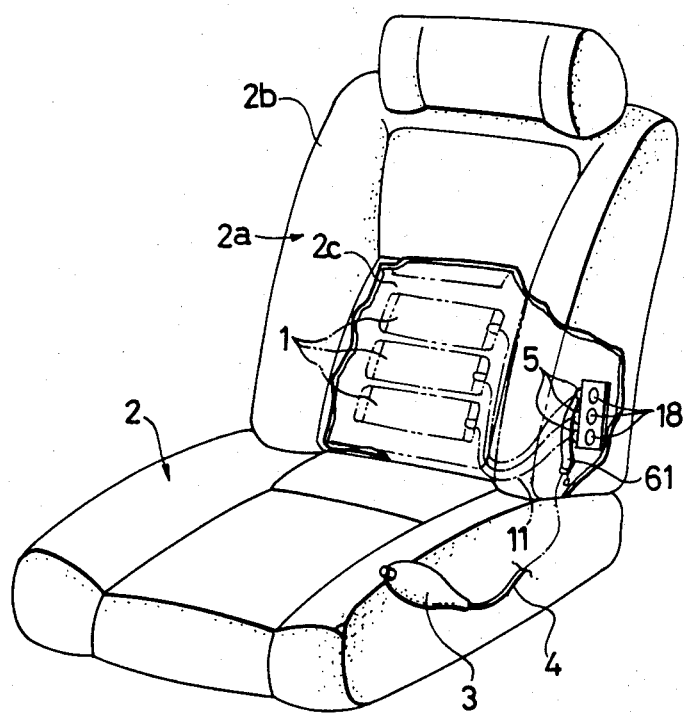
FIG. 1 is a perspective view, partly broken, of one embodiment of a lumbar support system for a vehicle seat according to the present invention.

Referring to the accompanying drawings, and first to FIG. 1, indicated by reference numeral 1 is an air bag, 2 is a vehicle seat and 2a is a seat back. The upholstery sheet 2b of the seat back 2a is shown partly broken away for facilitating the explanation. Three air bags 1 are disposed between the upholstery sheet 2b and a cushion material 2c which supports the upholstery 2b. The air bags 1 are mounted on the seat back 2a of the vehicle seat 2 at a position corresponding to the position of the waist of a person seated in the vehicle seat 2. A valve assembly 5 includes valves for supplying pressurized air to the air bag and for discharging the pressurized air from the air bag. A manual pump 3 is provided for supplying pressurized air to the air bags through a tubular passage 4 and through the valve assembly 5. The manual pump 3 comprises a rubber ball having an inlet, an outlet connecting to the tubular passage 4, and a check valve provided within the rubber ball.

Figure 2:
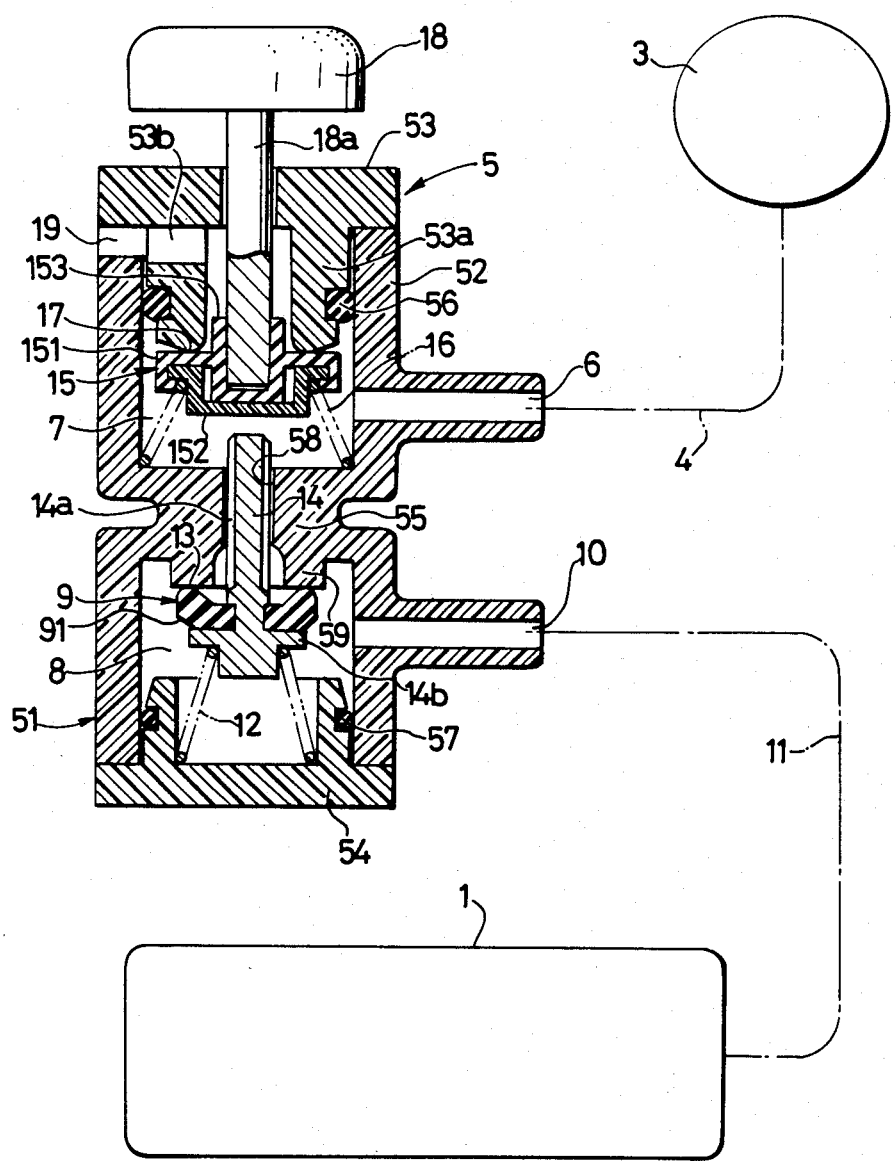
FIG. 2 is a sectional view of an exemplary valve assembly employed in a lumbar support system for a vehicle seat according to the present invention.

One such valve assembly 5 is provided for each air bag. Each valve assembly 5 includes, as shown in FIG. 2, a valve casing 51, a first normally closed valve 15, a second normally closed valve 9 and a push button 18 exterior to the surface of the upholstery sheet 2b of the seat back 2a.

The valve casing 51 includes a cylindrical body 52 having open opposite ends, a first end plate 53 and a second end plate 54 each closing the corresponding end of the cylindrical body 52 and a partition wall 55 formed integrally with and at the central portion within the cylindrical body 52 so as to partition the interior of the cylindrical body 52 into two chambers, namely, a first chamber 7 formed between the partition wall 55 and the first end plate 53 and a second chamber 8 formed between the partition wall 55 and the second end plate 54. The first chamber 7 communicates with the tubular passage 4 by means of an inlet port 6 formed on the cylindrical body 52, while the second chamber 8 communicates with the corresponding air bag 1 by means of an outlet port 10 formed on the cylindrical body 52 and a tubular passage 11 connected to the outlet port 10.

A cylindrical wall 53a is formed integrally with the first end plate 53 and is disposed within the first chamber 7 with its center axis in parallel with the axis of the cylindrical body 52. An opening 53b formed on the cylindrical wall 53a allows the communication of a discharge port 19 formed on the cylindrical body 52 by recesssing the edge of the cylindrical body 52 with the first chamber 7. Reference numerals 56 and 57 designate O-rings for achieving air-tight engagement between the inner wall of the cylindrical body 52 and the first and second end plates 53 and 54 respectively.

The cylindrical body 52, the first and the second end plates 53 and 54 are made of a hard synthetic resin through molding.

The first normally closed valve 15 is formed within the first chamber 7. The first normally closed valve 15 includes a rubber valve plate 151 supported by a supporting plate 152 made of a hard synthetic resin around the circumference thereof, a valve seat 17 formed on the cylindrical wall 53a of the first end plate 53 at the free end thereof and a conical spring 16 disposed between the supporting plate 152 and the partition wall 55. A bottomed cylindrical boss 153 is formed integrally with the valve plate 151 in the central portion thereof. A push button 18 is mounted on the first end plate 53 movably axially through the cylindrical wall 53a on the center axis thereof. The free end of the push rod 18a of the push button 18 is fixed to the boss 153 of the valve plate 151. Thus the valve plate 151 is pressed against the valve seat 17 continuously by the conical spring 16 so that the communication between the first chamber 7 and the discharge port 19 is interrupted in the normal state. When the push button 18 is depressed manually against the resilient force of the conical spring 16, the first chamber 7 is allowed to communicate with the discharge port 19.

An opening 58 allowing the communication between the first and the second chambers is formed in the central portion of the partition wall 55. The second normally closed valve 9 continuously closing the opening 58 is formed within the second chamber 8. The second normally closed valve 9 includes a rubber valve plate 91 attached to a rod 14 inserted through the opening 58 slidably coaxially of the push rod 18a of the push button 18, a valve seat 13 formed at the free end of a cylindrical wall 59 formed on the partition wall 55 enclosing the opening 58, a flange 14b formed at the lower end of the rod 14 and a conical spring 12 disposed between the flange 14b and the second end plate 54 for pressing the valve plate 91 against the valve seat 13. The second normally closed valve 9 is opened to allow the communication between the first and the second chambers 7 and 8 when the pressure of the pressurized air introduced into the first chamber exceeds the force of the conical spring 12 pressing the valve plate 91 against the valve seat 13 so as to close the normally closed valve 9 or when the push button 18 is depressed manually and then the rod 14 is pushed through the push rod 18a. The rod 14 is as long as to project into the first chamber 7 when the second normally closed valve 9 is closed. Axial grooves 14a are formed on the circumference of the rod 14 to allow smooth air flow between the first and the second chambers 7 and 8.

In the lumbar support system as shown in FIG. 2, when the manual pump 3 is operated, pressurized air is supplied into the first chamber 7 through the tubular passage 4 and the inlet port 6. When the pressure within the first chamber 7 exceeds a predetermined pressure, the second normally closed valve 9 is opened so that the pressurized air is introduced into the second chamber 8 as well as into the air bag 1 through the outlet port 10 and the tubular passage 11. When the air bag 1 is inflated to a desired size, the operation of the manual pump 3 is stopped, then the valve plate 91 is allowed to seat on the valve seat 13 by the resilient force of the spring 12 so that the pressure within the air bag 1 is maintained.

In order to discharge the pressurized air from the air bag 1, the push button 18 is operated manually so as to depress the push rod 18a, whereby the push rod 18a first opens the first normally closed valve 15 against the force of the spring 16 to allow the first chamber 7 to communicate with the discharge port 19, then depresses the rod 14 to open the second normally closed valve 9 thus allowing the second chamber 8 to communicate with the discharge port 19 through the first chamber 7. Consequently, the pressurized air contained within the air bag 1 is discharged through the tubular passage 11, the second chamber 8, the opening 58, the first chamber 7, the opening 53b and the discharge port 19. When it is desired to discharge the pressurized air quickly from the air bag 1, it is suggested that the air bag 1 is squeezed by hand through the upholstery sheet 2b of the seat back 2a.

An air accumulator containing pressurized air or an air pump driven by an electric motor may be employed as a pressurized air source instead of the manual pump 3 employed in this embodiment, however, in such a case, it is necessary to provide a mechanism to close the inlet port 6 or the tubular passage 4 simultaneously with the opening of the first normally closed valve 15 by means of the push button 18.

As shown in FIG. 1, a plurality of air bags 1 may be provided for the seat back 2a. When a plurality of air bags 1 are provided, one valve assembly 5 for each air bag 1 is provided on the seat back 2a. The respective inlet ports 6 of the all air bags 1 are connected to a single inlet manifold tube 61 so that pressurized air is supplied simultaneously to the all air bags 1 by means of a single manual pump 3. The discharging of the pressurized air from each air bag 1 can be achieved individually by the operation of the push button 18 of the corresponding valve assembly 5.

It will be understood from what has been described hereinbefore that the lumbar supporting system according to the present invention is capable of continuously changing the inflation of the air bags through the simple operation of inexpensive valve assemblies.

Obviously, numerous modifications and variations of the present invention are possible in light of the above teachings. It is therefore to be understood that within the scope of the appended claims, the invention may be practiced otherwise than as specifically described herein.

What is claimed is:
1. A lumbar support system for a vehicle seat, comprising:
    a pressurized air supply source;
    at leaset two air bags disposed at positions corresponding to the waist of a person seated in the vehicle seat;

each of said air bags being communicated with said pressurized air supply source through a valve casing, respectively;

each of said valve casings being attached to said vehicle seat and comprising a partition wall partitioning the interior of said valve casing into a first chamber and a second chamber, an inlet port opening into said first chamber and connected to said pressurized air supply source, a discharge port opening into said first chamber and allowing the communication of said first chamber with the exterior of said valve casing, an outlet port opening into said second chamber and allowing the communication of said second chamber with said corresponding air bag, and an opening by means of which said first chamber communicates with said second chamber;

a manually-operable push button movably supported on said valve casing;

a first normally closed valve formed within said first chamber for normally closing to interrupt the communication between said first chamber and said discharge port and adapted to be opened when said push button is manually operated; and a second normally closed valve formed within said second chamber for normally interrupting the communication between said first and second chambers and adapted to be opened when said first normally closed valve is opened as well as when the pressurized air is supplied in said first chamber from said pressurized air supply source, whereby an inadvertent opening of only said first valve by said push button does not release air pressure in said air bag.

2. A lumbar support system for a vehicle seat, comprising:

a pressurized air supply source;

an air bag disposed at a position corresponding to the waist of a person seated in the vehicle seat and between the upholstery sheet of the vehicle seat and the cushion material supporting the upholstery sheet;

a valve casing being attached to said vehicle seat and including a partition wall partitioning the interior of said valve casing into a first chamber and a second chamber, an inlet port opening into said first chamber and connected to said pressurized air supply source, a discharge port opening into said first chamber and allowing the communication of said first chamber with the exterior of said valve casing, an outlet port opening into said second chamber and allowing the communication of said second chamber with said air bag, and an opening formed in said partition wall for communicating said first chamber with said second chamber;

a manually-operable push button movably supported on said valve casing and having push rod fixed thereto at one end of said push rod;

a first normally closed valve formed within said first chamber for normally interrupting the communication between said first chamber and said discharge port, said first normally closed valve including a first valve member fixed to the other end of said push rod of said push button and adapted to close a release passage communicating said first chamber with said discharge port by a spring force, said first normally closed valve being adapted to open said release passage when said push button is manually operated; and a second normally closed valve formed within said second chamber for normally interrupting the communication between said first and second chambers, said second normally closed valve including a valve rod extending through said opening formed in said partition wall and being slidable coaxially with said push rod, said second valve further including a second valve member fixed to one end of said valve rod and projecting into said second chamber, said second valve member adapted to normally close said opening by a spring force, said second normally closed valve being constructed and adapted so as to open said opening against said spring force due to the movement of said first valve member of said first normally closed valve for discharging pressurized air prevailing in said air bag to the exterior of said valve casing via said first and second chambers, said release passage and said discharge port after said first normally closed valve opens said release passage through the manual operation of said push button, whereby an inadvertent opening of only said first valve by said push button does not release air pressure in said air bag.

3. A lumbar support system for a vehicle seat according to claim 2, wherein said first normally closed valve comprises a valve plate fixed to the other end of said push rod of said push button for opening and closing said release passage communicating said first chamber with said discharge portr and a spring applying said spring force to said valve plate in a direction such that said valve plate closes said release passage, whereby said valve plate is moved to open said release passage to allow the communication of said first chamber with said discharge port via said release passage when said push button is depressed manually against the force of said spring.

4. A lumbar support system for vehicle seat according to claim 2, wherein a cylindrical wall is disposed within said first chamber and connected to said valve casing, said release passage for communicating said discharge port with said first chamber is formed within the interior space of said cylindrical wall, said first normally closed valve includes a valve seat formed on said cylindrical wall at one end thereof, a valve plate fixed to the other end of said push rod of said push button extending through said release passage and adapted to seat on said valve seat and a spring applying said spring force to said valve plate so as to press said valve plate against said valve seat, whereby said valve plate is moved off said valve seat to allow the communication of said first chamber with said discharge port via said release passage when said push button is depressed manually against the force of said spring.

5. A lumbar support system for a vehicle seat according to claim 2, wherein said second normally closed valve includes a valve plate fixed to the other end of said valve rod slidably extending through said opening formed in said portion wall for opening and closing said opening, and a spring applying said spring force to said valve rod in a direction such that said valve plate closes said opening, whereby said valve plate is moved off said opening against the force of said spring when pressurized air is supplied into said first chamber so as to open said opening and to allow the pressurized air to flow into said second chamber, and also said valve plate is moved against the force of said spring when pressurized air is supplied into said first chamber so as to open said opening and to allow the pressurized air to flow into said second chamber, and also said valve plate is moved against the force of said spring so as to open said opening when said valve rod is depressed by the movement of said valve member of said first normally closed valve through the depression of said push button so that the pressurized air is discharged from said second chamber through said first chamber, said release passage and said discharge port.

6. A lumbar support system for vehicle seat according to claim 4, wherein a cylindrical wall surrounding said opening is formed on said partition wall and positioned within said second chamber, said second normally closed valve includes a valve seat formed on the free end of said cylindrical wall, a valve plate fixed to one end of said valve rod slidably extending through said opening formed in said partition wall and adapted to close said opening when seated on said valve seat and a spring applying said spring force to said valve plate in a direction such that said valve plate seats on said valve seat, and said valve rod is arranged coaxially apart a predetermined distance from the push rod of said push button, whereby as said push button is depressed manually, said push rod first opens said first normally closed valve, then pushes the valve rod of said second normally closed valve to move off said valve plate from said valve seat against the force of said spring so that said first chamber is allowed to communicate with said second chamber and pressurized air prevailing in the air bag is discharge via said first and second chambers, said release passage and said discharge port.

* * * * *